(12) United States Patent
Mentink

(10) Patent No.: US 7,255,731 B2
(45) Date of Patent: Aug. 14, 2007

(54) USE OF PARTICULAR POLYSACCHARIDES AS ADMIXTURES FOR MINERAL MATERIALS

(75) Inventor: Léon Mentink, Roubaix (FR)

(73) Assignee: Roquette Freres, Lestrem (FR)

(*) Notice: Subject to any disclaimer, the term of this patent is extended or adjusted under 35 U.S.C. 154(b) by 0 days.

(21) Appl. No.: 11/142,183

(22) Filed: Jun. 2, 2005

(65) Prior Publication Data

US 2006/0054062 A1    Mar. 16, 2006

(30) Foreign Application Priority Data

Jun. 2, 2004    (FR) .................................. 04 05960

(51) Int. Cl.
  *C08L 3/02*     (2006.01)
  *C08L 5/00*     (2006.01)
  *C09D 103/02*   (2006.01)
  *C09D 105/00*   (2006.01)
  *C09D 11/14*    (2006.01)
  *C09C 3/08*     (2006.01)
  *B01J 20/12*    (2006.01)

(52) U.S. Cl. ............................... 106/162.1; 106/206.1; 106/215.5; 106/217.6; 106/217.7; 106/217.9; 106/725; 106/727; 106/729; 106/730; 106/779; 106/804; 106/476; 106/501.1; 106/31.68; 106/31.71; 106/38.23; 106/213.1; 106/214.2; 507/207; 507/211; 507/212; 502/62; 524/27; 524/56

(58) Field of Classification Search ................... 127/32; 106/730, 779, 804, 205.9, 217.9, 468, 476, 106/501.1, 823, 162.1, 31.68, 31.71, 38.23, 106/213.1, 214.2, 215.5, 217.6, 217.7, 725, 106/727, 729; 507/111, 207, 211, 212; 502/62; 524/27, 56

See application file for complete search history.

(56) References Cited

U.S. PATENT DOCUMENTS

| 4,432,801 | A  | * | 2/1984  | Tegiacchi et al. ............ 106/729 |
| 5,817,780 | A  |   | 10/1998 | Fleche et al. |
| 5,837,060 | A  | * | 11/1998 | Fouache nee Ducroquet et al. ............................ 127/36 |
| 5,880,182 | A  | * | 3/1999  | Minomiya et al. ............. 524/5 |
| 6,630,586 | B1 |   | 10/2003 | Fouache et al. |
| 6,648,964 | B2 | * | 11/2003 | Mentink et al. ............. 106/729 |
| 6,811,604 | B2 | * | 11/2004 | Mentink et al. ............. 106/729 |

FOREIGN PATENT DOCUMENTS

| EP | 1 006 128 | 6/2000 |
| FR | 2 722 200 | 1/1996 |
| GB | 1 508 761 | 4/1978 |

\* cited by examiner

*Primary Examiner*—David M. Brunsman
(74) *Attorney, Agent, or Firm*—Young & Thompson

(57) ABSTRACT

The subject of the present invention is the use of particular polysaccharides as admixtures for mineral materials, especially as admixtures for mineral binders. These polysaccharides have, characteristically:
  a weight-average molecular weight $M_w$ of at least 500 g/mol and at most 9000 g/mol, especially between 700 and 7000 g/mol; and
  a degree of branching DB of at least 10%, especially between 10 and 40%. The invention also relates to the combined use, in mineral materials, including especially mineral binders, of these particular polysaccharides on the one hand and of certain other admixtures on the other hand, for example admixtures, of saccharidic or nonsaccharidic type, having a plasticizing, superplasticizing or other functionality.

19 Claims, No Drawings

USE OF PARTICULAR POLYSACCHARIDES AS ADMIXTURES FOR MINERAL MATERIALS

FIELD OF THE INVENTION

The subject of the present invention is the use of particular polysaccharides as admixtures for mineral materials, especially as admixtures for mineral binders.

The invention also relates to the combined use, in mineral materials, including especially mineral binders, of these particular polysaccharides on the one hand and of certain other admixtures on the other hand, for example admixtures, of saccharidic or nonsaccharidic type, having a plasticizing, superplasticizing or other functionality.

The subject of the present invention is also mineral materials and mineral binders thus admixed and their method of preparation.

The term "mineral material" is understood to mean any liquid, pasty or solid composition comprising one or more mineral materials chosen especially from silica, quartz, mica, metal oxides, cement, lime, pozzolana, silica fume, blast-furnace and steelmaking slag, fly ash, kaolins, talc, clays, zeolites, bentonites, mineral carbon, calcium carbonate, magnesium carbonate, calcium sulfate, gypsum, carbon black, titanium oxide, graphite, or any mixtures of these mineral materials. To give examples, this mineral material may consist of a dispersion of pigments or fillers, a drilling mud, a foundry sand, a cement, a mortar, a concrete, a render, a plaster, a clay-based absorbent composition, a ceramic, a brick, a tile, a tire, a combustible pellet, an asphalt, a filled adhesive or a paint.

Advantageously, said mineral material consists of a mineral binder.

The term "mineral binder" is understood in the first place as any hydraulic binder and more particularly any composition, especially any mineral powder, capable of forming with water a slurry that progressively sets and hardens, even when air is excluded. Conventionally, at ambient temperature, a mineral binder starts to form, with water, such a slurry in a time ranging from a few minutes to less than 48 hours, generally between about 30 minutes and 24 hours.

This definition applies, without this list being exhaustive:
  to cements, and in particular to those belonging to the group comprising artificial Portland cements, formulated Portland cements, blast-furnace cements, clinker slag cements, slag/fly ash cements, and also to ground cements for particular usages, such as lime slag cement, masonry cement, natural cement, supersulfated cement, rapid-hardening cement, quick-setting/rapid-hardening cement, and cement for work in water with a low or high sulfate content;
  to natural or artificial hydraulic limes; and
  to mixes such as mortars, grouts, renders and concretes, based on cement and/or lime, on water and/or on aggregates of all particle sizes (sands, gravels, stones, etc.), in particular those belonging to the group comprising premixed dry industrial mortars, mortars prepared on site, predosed dry industrial mortars, ready-to-use mortars, fluid mortars, injection mortars, grouts and injection grouts, reinforced or nonreinforced concretes, self-placing and self-leveling concretes, "high performance", "very high performance" and "ultrahigh performance" concretes, heavyweight concretes, lightweight concretes, lightweight insulating concretes, cellular concretes, fiber-reinforced concretes, prestressed concretes and exposed concretes.

This definition also includes the raw materials used in the manufacture of the cements, such as pozzolana, clinker, slag, calcareous fillers and silica fume, and the components of said raw materials.

The term "mineral binder" is also understood to mean nonhydraulic binders, in particular materials based on calcium sulfate, gypsum and/or lime.

The aforementioned mineral materials and other mineral materials are also those that can be used as materials in the following fields: the chemical industry, glues and adhesives, inks and paints, paper and board, detergents, plastics, textiles, agglomerates, whether or not combustible, metallurgy, drilling, phytosanitary products, pharmaceuticals, cosmetics, etc.

BACKGROUND OF THE INVENTION

Depending on the end use of these materials, but also on the precise conditions in which they will be stored, transported and/or processed, it is often necessary to incorporate thereinto specific admixtures with a view to improving one or more particular characteristics thereof or to give them one or more particular characteristics, such as workability, storage stability, biodegradability, fluidizing, lubricating, bonding, film-forming, binding, suspending or dispersing capability, hydration or dryness capability and/or other characteristics connected with constraints of the technical, economic and/or regulatory kind.

As examples of admixtures for mineral binders, mention may be made of milling agents or grinding auxiliaries, plasticizers, water-reducing plasticizers, superplasticizers, setting and hardening accelerators, setting retarders, air entrainment agents, mass water-repellant agents and cure agents. These admixtures make it possible for example to modify the workability, the setting, the hardening, the strength and the durability of the mineral binder and/or certain other properties thereof.

Many water-reducing plasticizers or superplasticizers, whether or not of saccharidic nature, have already been used. As examples, mention may be made of:
  molasses, obtained from sugar beet and sugar cane, which are inexpensive fermentable products but of limited effectiveness;
  raw lignosulfonates, obtained from the paper industry, which are inexpensive but have the drawbacks of generating salts in the form of alkali metal chlorides, these generally being undesirable to users, and of causing the mortars or concretes to foam, thus reducing their 28-day strength;
  sugars obtained from starch (glucose, maltose and starch hydrolysates containing them, such as maltodextrins and glucose syrups), which are good water-reducing plasticizers that generally do not contain alkali metal salts but are strong setting retarders;
  oxidized sugars, such as alkali metal (especially sodium) gluconates and oxidized starch hydrolysates containing them, which are very good water-reducing plasticizers and setting retarders, and which also make it possible to improve the 28-day strength but are sources of alkali metal (in particular sodium) ions;
  hydrogenated sugars, such as sorbitol, maltitol, and hydrogenated starch hydrolysates containing them, which are water-reducing plasticizers but are, however, much inferior retarders than oxidized sugars, while still being 28-day strength improvers;
  sulfonated naphthalene-formaldehyde condensates and sulfonated melamine-formaldehyde condensates, which are very good plasticizers and weak setting retarders, but which however do not improve the 28-day strength and are not environmentally friendly; and polyacrylates and styrene/maleic anhydride copolymers, which are superplasticizers and weak setting retarders but which have a high cost, are poorly biodegradable and, however, contribute little or no improvement to the 28-day strength.

As may be seen, as regards the particular field of mineral binders, the industry has in particular sought water-reducing plasticizers or superplasticizers that are environmentally friendly and provide, at the same time, very good plasticity for a sufficient time, little setting delay and strength values that are consistent with the technical requirements.

However, the technico-economic benefit of such hypothetical products requires them to be, moreover:
a) able to be used for a maximum range of functionalities and/or for a maximum number of applicative fields in the general field of minerals materials, including under very varied pH or temperature conditions;
b) able to be readily used, but also stable, storable, transportable and miscible with other mineral material admixtures, and be so, both in the dry state and in the liquid state, including in liquid compositions having a high dry matter (DM);
c) suitable to the maximum as regards regulatory constraints, whether current or future ones, including in terms of human and environmental protection; and
d) capable of being obtained using relatively simple and inexpensive methods.

There is therefore a need to have an admixture of natural origin, which is of low cost and is capable of being advantageously used 1) in the general field of mineral materials and in particular 2) in the particular field of mineral binders, particularly as a plasticizer or superplasticizer, whether by itself or mixed with other products.

SUMMARY OF THE INVENTION

Advantageously, the Applicant has discovered that such an admixture may consist of or contain a polysaccharide selected both by its molecular weight and by its degree of branching.

DETAILED DESCRIPTION OF THE INVENTION

More precisely, the subject of the present invention is the use, as an admixture for mineral materials, of a polysaccharide characterized by:
a weight-average molecular weight $M_w$ of at least 500 g/mol and at most 9000 g/mol, especially between 700 and 7000 g/mol; and
a degree of branching DB of at least 10%, especially between 10 and 40%.

The weight-average molecular weight $M_w$ of said polysaccharide, expressed in g/mol, is measured by size exclusion chromatography, with calibration using pullulans of known molecular weight.

Its degree of branching DB, expressed in %, corresponds here to the ratio of the percentage content of 1-6 glucosidic bonds of said polysaccharide to the combined percentage content of 1-6 glucosidic bonds and 1-4 bonds of said polysaccharide.

These percentage contents of glucosidic bonds are measured by proton NMR analysis at 60° C. in a $D_2O$ solution.

According to a preferred variant, said polysaccharide thus selected has:
a weight-average molecular weight $M_w$ of between 1000 and 6000 g/mol; and
a degree of branching DB of between 12 and 30%.

Particularly advantageously, the polysaccharide used according to the present invention has:
a weight-average molecular weight $M_w$ of between 1500 and 5500 g/mol; and/or
a degree of branching DB of between 15 and 25%.

In another embodiment of the invention, a polysacaharide as selected according to any one of the abovementioned variants is employed, which has, furthermore, a polymolecularity index PI of at most 4, preferably between 1.5 and 4, said polymolecularity index corresponding to the ratio of the aforementioned weight-average molecular weight $M_w$ of said polysaccharide to the number-average molecular weight $M_n$ of the same polysaccharide.

The number-average molecular weight $M_n$, also expressed in g/mol, is measured using the same method as the weight-average molecular weight $M_w$.

The polymolecularity index PI may especially lie within a relatively narrow range, namely between 2 and 4 and especially between 2.5 and 4.

The polysaccharide that can be used according to the invention may be obtained by any means or combination of means likely to confer on it the desired $M_w$, DB and, optionally, PI characteristics mentioned above.

This product may especially be obtained from any polysaccharide extracted from plants and especially any glucose and/or fructose polymer, for example starch or insulin, extracted from cereals (including all genotypes of wheat, maize, rice, sorghum, barley, etc.), from legumes (including all genotypes of peas, broad beans, field beans, etc.), from *solanaceae* (including all potato genotypes), from *Euphorbiaceae* (including all cassava genotypes) or from compounds (including all chicory genotypes).

The polysaccharide that can be used according to the invention may for example be obtained using the general or particular teachings of patent EP 1 006 128 published in the name of the Applicant, in particular according to the teachings of paragraphs [0037] to [0059] of said patent, a person skilled in the art adapting if necessary said teachings with a view to obtaining the characteristics desired here, namely $M_w$, DB and, optionally, PI.

The polysaccharide thus selected, as admixture for mineral materials and especially for mineral binders, may be used in purified or unpurified, concentrated or unconcentrated, hydrogenated or unhydrogenated form, and especially after having undergone, or not, one of the following steps: purification/decoloration/concentration, molecular fractionation, elimination of glucose and/or hydrogenation that are described in said patent EP 1 006 128.

This polysaccharide thus selected may also be subsequently modified chemically, for example by the grafting of fatty chains, by alkylation using ethylene or propylene oxide, by sulfonation or sulfation.

This polysaccharide may be used in solid form, for example in the form of a freely flowing powder, or in liquid form, for example solutions having a dry matter (DM) of between 15 and 80%, preferably between 20 and 70%.

One of the technico-economic advantages of the particular polysaccharides according to the invention is also their ability to be prepared, stored, transported, mixed and used in liquid forms having a high DM (at least equal to 60%, or even 70% or higher) while still remaining perfectly stable and pumpable.

The Applicant has found that the particular polysaccharides according to one of the abovementioned variants can advantageously be used as admixtures for mineral binders, and are significantly more effective than, inter alia:

- on the one hand, maltodextrins, i.e. products resulting from just the enzymatic or acid hydrolysis of starch, having weight-average molecular weights $M_w$ that may be similar to those of said particular polysaccharides but having an essentially linear structure and therefore having a significantly lower degree of branching DB, generally between 3 and 7%, and significantly higher polymolecularity indices PI, generally between 4 and 9; and
- on the other hand, dextrins, also called pyrodextrins, i.e. products resulting from the acid hydrolysis and from the conversion (repolymerization, transglucosidation), in a medium with a very low water content (at most 5% water), of starch, having a degree of branching DB that may be up to or exceed 10%, usually between 4 and 9%, but having weight-average molecular weights $M_w$ of around 10 000 to 60 000 g/mol, and therefore significantly higher than those of said particular polysaccharides, as well as polymolecularity indices PI that are also higher, generally between 4 and 6.

In particular, it has been found that the polysaccharides used according to the invention can, by themselves or in combination with conventional plasticizers or superplasticizers, improve the physical properties of mortars or concretes in the fresh state but also in the cured state.

Remarkably, said polysaccharides make it possible in particular:

- to improve, without water reduction, the immediate plasticity and the workability (i.e. the maintaining of good plasticity over a time long enough to allow correct placing) of grouts, mortars and concretes;
- to reduce the amount of mixing water, while maintaining good workability;
- owing to their high fluidizability, to be advantageously combined, for example, with expensive commercial superplasticizers (polycarboxylates, polyphosphonates, etc.) and especially to be incorporated into these products with very substantial degrees of incorporation (up to about 30-40% by weight) and to do so without impairing the superplasticizing properties of these products;
- to reduce, relatively substantially, the setting delay that other products, such as for example sodium gluconates, confer;
- to not cause "false setting" effects;
- to limit the evaporation of water in very hot weather or during high-temperature manufacturing steps, and therefore to be used, for example, in cure agents for concretes, tiles, bricks and plasterboards;
- to prepare specific concretes and, for example, to be sprayed onto molds or formwork so as to retard setting only on the surface of the concrete;
- with or without reduction in mixing water, to very substantially increase the 28-day strength;
- because they provide no sodium or potassium ions, to manufacture mineral binders of improved durability over time since, during the hydration phase, they limit the possibility of generating sodium or potassium hydroxides and, indirectly, calcium hydroxides (calcium ions being contained in the cement), these hydroxides resulting, over the course of time, in mechanical stresses and then microcracks within the concrete;
- because they provide no chlorides, to be used without any drawback in the manufacture of reinforced concrete; and
- to act favorably on the density and impermeability of concretes.

All the aforementioned advantages are accompanied by a biodegradable and completely harmless character of the particular polysaccharides according to the invention, which, in particular, contain no formaldehyde, nor phenolic compounds, nor heavy metals.

Very advantageously as a result, the subject of the present invention is the use of said particular polysaccharides as admixtures for mineral binders, in particular for cements, grouts, mortars and concretes.

This use may also be characterized in that said polysaccharides are used, simultaneously or otherwise, with at least one other admixture chosen from strength improvers, milling agents or grinding auxiliaries, plasticizers, water-reducing plasticizers, superplasticizers, setting and hardening accelerators, setting retarders, air entrainment admixtures, mass water-repellant agents, cure agents and any mixtures thereof.

This use may in particular be characterized in that said polysaccharides and said other admixture are used simultaneously, especially by means of a single composition containing, at least, these two products.

The admixture used, simultaneously or otherwise, with said polysaccharides may advantageously be chosen from setting accelerators, plasticizers, which may or may not be water reducers, superplasticizers, setting retarders and any mixtures thereof.

According to another variant, it may be advantageously chosen from admixtures of the saccharidic type, borate, amine, ketone, polyhydroxylic, monocarboxylic, polycarboxylic and polyphosphonic admixtures of the nonsaccharidic type, and any mixtures thereof, and in particular it may be chosen from optionally hydrogenated or oxidized monosaccharides, optionally hydrogenated or oxidized disaccharides, lactic acid and its salts, acetic acid and its salts, glycerol, lignosulfonates, ethanolamines, borax, polymers and copolymers based on acrylic, methacrylic and/or maleic acid and their salts, ethers or esters, and/or styrene-based polymers and copolymers and any mixtures thereof.

The subject of the present invention is also an admixture for a mineral material, in particular for a mineral binder, characterized in that it contains:

- at least one component A consisting of a polysaccharide having a weight-average molecular weight $M_w$ of at least 500 g/mol and at most 9000 g/mol and a degree of branching DB of at least 10%, especially between 10 and 40%; and
- at least one component B chosen from optionally hydrogenated or oxidized monosaccharides, optionally hydrogenated or oxidized disaccharides, lactic acid and its salts, acetic acid and its salts, glycerol, lignosulfonates, ethanolamines, polymers and copolymers based on acrylic, methacrylic and/or maleic acid, their salts, ethers or esters, and styrene-based polymers or copolymers.

Component A may especially have $M_w$ and DB, but also polymolecularity index PI, values falling within one or other of the ranges described above.

Component B may especially be chosen from glycerol, isosorbide, sorbitol, maltitol, gluconates, maltobionates, lactates, acetates, lignosulfonates, polyacrylates and any mixtures thereof that contain at least any two of these products.

Said composition containing the aforementioned components A and component B may especially be in a liquid form having a DM of at least 15%, preferably between 20 and 70%.

The Applicant has found that the particular polysaccharides according to the invention can, by themselves or in combination with other admixtures of saccharidic or non-saccharidic type, be advantageously used in the particular field of mineral binders (cf. above) but also, as examples:

- in the drilling field, as clay antiswelling agents and/or lubricating agents;
- in the tiles and bricks field, as plasticizers and/or water loss regulators during firing;
- in the foundry field and the field of sintered or granulated materials, as stripping agents and/or binders;
- in the plasterboard field, as agents for protecting against the overcuring of plaster at the paper/plaster interface, and/or adhesion promoters;
- in the field of mineral dispersions, such as filled adhesives, paints, coating slips and inks, and mineral powders (fillers, pigments, ceramics, carbon black, carbon), as suspension agents, dispersants and/or antidust agents;
- in the field of clay-based absorbent compositions, as binders and/or plasticizers.

As a result of which, there is now available a novel admixture for mineral materials that remarkably has the advantage of being multifunctional while at the same time inexpensive and environmentally friendly.

The present invention will now be described in even greater detail by means of the following examples, which are in no way limiting.

General Conditions for Tests on Standardized Motar

Preparation of a Control Mix and of a Mix with Admixture, for a W/C Ratio of 0.5

225 g of potable water and 450 g of cement with the reference 51.5 N from Lumbres (CEMI 52.5 N CP2 Colibri) were mixed for 30 seconds at a speed of 140 rpm in the bowl of a standardized mixer sold by Perrier and in accordance with the ASTM C305 standard. Next, 1350 g of standardized (EN 196-1) sand is added and stirred for 30 seconds at 140 rpm then 30 seconds at 280 rpm. Next, the stirring is stopped and the preparation thrown onto the walls is scraped off using a spatula and left to rest. The three operations are carried out in 1 minutes 30 seconds. The mix is stirred again for 1 minute at 280 rpm. The stirring corresponds to the time T=0.

While the admixtures according to or not according to the invention are added to the mortar, good homogeneity is ensured thanks to the prior dilution of the agents in the mixing water.

Spread Measurement

These measurements are carried out on a shock table consisting of a circular stainless steel plate and hammer/anvil system, controlled by a counter, allowing one shock per second. Each shock corresponds to being dropped from a height of 15 mm. As soon as the mix prepared in the manner described above is complete, a stainless steel frustoconical mold, having a diameter of 10 mm at the base, a diameter of 70 mm at the top and a height of 60 mm, is filled. The mold thus filled is then placed at the center of the circular plate of the shock table. The mold is then removed and the shock table turned on. After 15 seconds, the shock table is stopped and the mean E, expressed in mm, of 6 spread diameter measurements of the slumped concrete is calculated.

These measurements are performed at 20° C. and for a relative humidity of 65%.

After each measurement, the mortar spread on the plate of the shock table is put back into the bowl of the mixer, left at rest for 15 minutes and then mixed for 30 seconds at a speed of 280 rpm. A spread test is then carried out again. This same operation is repeated until the spread mortar has the appearance of wet earth and forms aggregates that break up and no longer allow the diameter to be correctly measured.

The workability of a mortar at a given time T, expressed in percent, is measured according to two variants:

1) the workability $W_T$ corresponds to the ratio of the mean spread measured at time T for said mortar to the mean spread measured at $T_0$ (i.e. at the end of mixing) for the control mortar with no admixture, this ratio being multiplied by a factor of 100;
2) the workability $W'_T$ corresponds to the ratio of the mean spread measured at the time T for said mortar to the mean spread measured at the same time T for the control mortar with no admixture, this ratio being multiplied by a factor of 100.

Setting Time Measurement

To carry out this test, frustoconical molds with a height of 40 mm, a bottom diameter of 80 mm and a top diameter of 70 mm, are filled with the mix as prepared above. The molds are immersed, without being covered, in demineralized water at 20° C.

The measurements are performed using an automatic set meter of the ACHMEL PA 8 brand.

The measurement frequency is adjustable, from 10 min to 30 min, as is the measurement start time. 65 measurements are performed on a preparation.

The automatic set meter determines the start-of-setting time and the end-of-setting time.

EXAMPLE 1

A control mix (MORTAR T) and various mixes with admixtures according to the invention (MORTARS A to C) or not according to the invention (MORTARS T1 and T2) were prepared as described above, into which mixes 0.17% (dry/dry) of the following were introduced, respectively:

MORTAR A: PRODUCT A, which can be used according to the invention, consisting of a polysaccharide having a weight-average molecular weight $M_w$ of about 2700 g/mol, a degree of branching DB of about 20% and a number-average molecular weight $M_n$ of about 680 g/mol, and therefore a polymolecularity index PI of about 4;

MORTAR B: PRODUCT B, a polysaccharide that can be used according to the invention and having the following characteristics: $M_w$=3970 g/mol; DB=21%; $M_n$=1130 g/mol and PI=3.5;

MORTAR C: PRODUCT C, a polysaccharide that can be used according to the invention and having the following characteristics: $M_w$=3855 g/mol; DB=27%; $M_n$=1175 g/mol and PI=3.3;

MORTAR T1: PRODUCT T1, which cannot be used according to the invention, consisting of a yellow dextrin having the following characteristics: $M_w$=9605 g/mol; DB=11%; $M_n$=2435 g/mol and PI=3.9;

MORTAR T2: PRODUCT T2, which cannot be used according to the invention, consisting of a maltodextrin having the following characteristics: $M_w$=8780 g/mol; DB=4%; $M_n$=1110 g/mol and PI=7.9.

The spread E (in mm), the workability $W_T$ (in percent), 1 hour and 2 hours after mixing respectively (hereafter called $W_1$ and $W_2$, respectively), the workability $W'_T$ (in percent), 1 hour and 2 hours after mixing respectively (hereafter called $W'_1$ and $W'_2$, respectively), the setting start time (SS), the setting finish time (SF) and the setting time (ST=SS–SF), the latter 3 characteristics being expressed as hours:minutes, were measured for each of the MORTARS T (with no admixture), MORTARS A to C (with admixtures according to the invention) and MORTARS T1 and T2 (with admixtures, but not in accordance with the invention).

The table below gives, for each of said MORTARS, each of the parameters E, $W_1$, $W_2$, $W'_1$, $W'_2$, SF, SS and ST.

| MORTAR | E | $W_1$ | $W_2$ | $W'_1$ | $W'_2$ | SS | SF | ST |
| --- | --- | --- | --- | --- | --- | --- | --- | --- |
| T | 245.8 | 83.3 | 73.7 | 100 | 100 | 4:10 | 5:45 | 1:35 |
| T1 | 277.2 | 90.8 | 78.7 | 109 | 106.9 | 10:25 | 12:10 | 1:45 |
| T2 | 280.7 | 92.6 | 82.0 | 111.1 | 111.2 | 16:30 | 19:25 | 2:55 |
| A | 283.2 | 97.5 | 85.3 | 107.1 | 115.8 | 15:25 | 18:20 | 2:55 |
| B | 291.7 | 94.5 | 83.7 | 113.4 | 113.7 | 14:25 | 16:50 | 2:25 |
| C | 291.5 | 95.9 | 84.4 | 115.1 | 114.6 | 14:50 | 17:55 | 3:05 |

These results show overall that PRODUCTS A, B and C selected according to the invention are, in the present case:

very good plasticizers, making it possible to obtain a spread E of greater than 283 mm, possibly exceeding 290 mm, something not achievable with PRODUCTS T1 and T2;

set retarders, making it possible to obtain setting start values SS intermediate between that obtained with PRODUCT T1 and that obtained with PRODUCT T2;

very good agents for improving workability, even better than PRODUCTS T1 and T2.

Additional tests showed that the introduction, into a mortar, of any one of PRODUCTS A, B or C selected according to the invention, makes it possible to very substantially increase the 28-day strength characteristics of this same mortar but without admixture.

This increase in 28-day strength was, for example, about 40% in the case of PRODUCT B, whereas it was only about 13% and 30% for PRODUCTS T1 and T2, respectively.

EXAMPLE 2

In this example, the performance of a polysaccharide selected according to the invention (PRODUCT D) was studied as partial substitute for commercial superplasticizer of the nonsaccharidic type, in this case the polyacrylate composition sold by MBT under the name GLENIUM® 51 and denoted hereafter as POLYACRYLATE A.

PRODUCT D had the following characteristics: $M_w$=2705 g/mol; DB=20%; $M_n$=795 g/mol and PI=3.4.

In the present case, the control mortar with no admixture, was prepared as described above except that the cement used was a cement with the reference "CPA 52.5 CEMI CP2 Holcim".

This control mix, with a W/C ratio of 0.5, had a spread of 235 mm measured as described above.

Firstly, POLYACRYLATE A was studied with the objective of reducing the amount of water, so as to obtain a mortar with 0.3% (dry/dry) of said POLYACRYLATE A admixture, the spread of which was close to that of the control mortar (235 mm).

A mortar mix with 0.3% POLYACRYLATE A admixture was thus obtained, having an initial spread of about 238 mm and a W/C ratio of about 0.37, i.e. a reduction in water content of about 20% relative to the control mortar (W/C=0.5).

90 minutes after mixing, the mortar with admixture had a spread of about 207 mm, i.e. about 87% of the initial spread value.

Within the context of the present invention, the substitution of the 0.3% POLYACRYLATE A with a blend consisting of 0.225% POLYACRYLATE A+0.075% of the above-mentioned PRODUCT D was studied.

What was successfully obtained was a mortar mix having an initial spread of 234 mm, very close to that of the control mortar but with no admixture, and with:

a W/C ratio of 0.4, i.e. a water reduction of 20% over said control; and a spread of about 210 mm, as measured 90 minutes after mixing, i.e. about 90% of the initial value.

This example shows that a polysaccharide such as PRODUCT D may, for example, substitute perfectly for 25% of the weight of polyacrylate, which is a more expensive admixture, and may do so without impairing the performance of the latter. Other tests carried out by the Applicant have confirmed more generally that the polysaccharides selected according to the invention can be advantageously used in combination with polyacrylates and/or other admixtures of nonsaccharidic type, especially within (super)plasticizer systems, which themselves may or may not be used as water reducers.

The polysaccharides selected according to the invention thus prove to be, from the technico-economic standpoint, excellent products for "cutting" many polyacrylate compositions, for example those used in the field of prefabrication or self-leveling concretes.

These "cutting" products may especially replace 2 to 40%, in particular 5 to 30%, by weight (dry/dry) of conventional superplasticizers.

EXAMPLE 3

This example compares the performance of the above-mentioned PRODUCT A and PRODUCT T2 within the context of the preparation of plasterboards.

More precisely, the influence on the paper/plaster bonding performance of replacing, in an amount of 20% by weight (dry/dry), the fluidized maize starch FLUITEX® 065 X sold by the Applicant with either PRODUCT A (which can be used according to the invention) or with PRODUCT T2 (which cannot be used according to the invention) was evaluated.

This performance was studied on each of the two faces (1) the "visible" face and 2) the "back" face) of a plasterboard (high-purity gypsum-based desulfurized plaster) coated with a suitable paper of about 200 g/m² weight.

For each test, the bonding was rated, twice, for each of the two faces of the plasterboard, according to the following rating (scale from 1 to 5):

0 no bonding
1 very weak bonding
2 weak bonding
3 average bonding
4 strong bonding
5 very strong bonding.

The ratings below were obtained for ADMIXTURE T1 (solely based on FLUITEX® 065 X starch), for ADMIXTURE T2 (20% of said starch replaced with PRODUCT T2) and for ADHESIVE A according to the invention (20% of said starch replaced with ADMIXTURE A), respectively, with a constant amount of adhesive (0.05% by weight/plaster).

|  | VISIBLE FACE | | BACK FACE | |
|---|---|---|---|---|
| ADMIXTURE T1 | 2 | 2 | 2 | 3 |
| ADMIXTURE T2 | 2 | 2 | 1 | 1 |
| ADMIXTURE A | 5 | 5 | 5 | 5 |

This shows that PRODUCT A is not only much more effective than PRODUCT T2 but it makes it possible, against all expectation, as a replacement for only 20% by weight of the plasticized maize starch, to obtain particularly strong bonding between the paper and the plaster, for as low a dose.

It is also worth pointing out that the drastic improvement in bondability obtained by the use of PRODUCT A is manifested with the same intensity (rating obtained: 5) on both faces of the plasterboard.

EXAMPLE 4

This example was used to study the possibility of using the abovementioned PRODUCT A as binding agent for the purpose of granulating a clay, in this case ACTICOL® bentonite sold by Continentale Parquer.

The granulation tests were carried out in a ROBOT-COUPE mixer, using 10% by weight (dry/dry) of PRODUCT A relative to the bentonite. The mix contained 10% water by weight. The composition obtained was dried over an AEROMATIC fluidized bed for 20 minutes at 90° C. and then screened on a 500 and 2500 µm screen. The granulated fraction of the composition, having a particle size of between 500 and 2500 µm, was studied for the purpose of testing water absorption and abrasion.

The water absorption tests showed overall that the bentonite granulated in the presence of PRODUCT A had not only a higher rate of hydration but also a higher final absorbtivity than the same bentonite:

either when granulated solely in the presence of water;

or when granulated in the presence of hydrogenated sugars, such as sorbitol and/or maltitol.

The abrasion tests also indicated that the granulation yield, that is to say the degree of recovery of particles with a size between 500 and 2500 µm, was improved as a result of using PRODUCT A, compared to bentonite granulated in the presence of only water or of certain hydrogenated sugars.

The same conclusions may be drawn when another polysaccharide selected according to the invention, in this case PRODUCT E having the following characteristics: $M_w$=5390 g/mol; DB=23%; $M_n$=3070 g/mol and PI=1.75, was used as bentonite binding agent.

Moreover, said PRODUCT E was advantageously used as lightweight sodium carbonate binding agent for the purpose of preparing antifoam granules intended to be incorporated into detergent compositions.

The invention claimed is:

1. An admixture for a mineral material comprising:
   at least one component A consisting of a polysaccharide having weight-average molecular weight Mw of at least 500 g/mol and at most 9000 g/mol and a degree of branching DB of between 10 and 40%; and
   at least one component B selected from the group consisting of oxidized disaccharides, lignosulfonates, ethanolamines, polymers and copolymers based on acrylic, methacrylic and/or maleic acid, their salts, ethers or esters, and styrene-based polymers or copolymers and mixtures thereof.

2. The admixture for a mineral material according to claim 1 wherein the polysaccharide has a dry matter (DM) of between 20% and 70%.

3. A composition selected from the group consisting of mineral binders, cements, grouts, mortars, concretes, clay antiswelling agents in the drilling field, lubricating agents in the drilling field, plasticizers in the tiles and bricks field, water loss regulators during firing in the tiles and bricks field, stripping agents in the foundry field and in the fields of sintered or granulated materials, binders in the foundry field and in the field of sintered or granulated materials, sintered materials, agents for protecting against the overcuring of plaster at the paper/plaster interface in the plasterboard field, adhesion promoters in the plasterboard field, mineral dispersions, filled adhesives, paints, coating slips and inks, mineral powders, fillers in the field of mineral dispersions, pigments in the field of mineral dispersions, ceramics in the field of mineral dispersions, carbon black in the field of mineral dispersions, carbon in the field of mineral dispersions, suspension agents in the field of mineral dispersions, dispersants in the field of mineral dispersions, antidust agents in the field of mineral dispersions, clay-based absorbent compositions, binders in the field of clay-based absorbent compositions, and plasticizers in the field of clay-based absorbent compositions, said composition comprising:
   one or more mineral materials; and
   an admixture for mineral materials comprising a polysaccharide having a weight-average molecular weight $M_w$ of at least 500 g/mol and at most 9000 g/mol and a degree of branching DB of between 10% and 40%.

4. The composition according to claim 3, further comprising at least one other admixture selected from the group consisting of strength improvers, milling agents, grinding auxiliaries, plasticizers, water-reducing plasticizers, superplasticizers, setting accelerators, hardening accelerators, setting retarders, air entrainment agents, mass water-repellant agents, cure agents and mixtures thereof.

5. The composition according to claim 4, wherein said other admixture is selected from the group consisting of admixtures of the saccharidic type, borate, amine, ketone, polyhydroxylic, monocarboxylic, polycarboxylic and polyphosphonic admixtures of the nonsaccharidic type, and any mixtures thereof.

6. The composition according to claim 4, wherein said other admixture is selected from the group consisting of monosaccharides, oxidized monosaccharides, disaccharides, oxidized disaccharides, lactic acid and its salts, acetic acid and its salts, glycerol, lignosulfonates, ethanolamines, borax, polymers and copolymers based on acrylic, methacrylic acid and its salts, maleic acid and its salts, ethers, esters, styrene-based polymers and styrene-based copolymers, and mixtures thereof.

7. The composition according to claim 3, wherein the polysaccharide has a weight-average molecular weight Mw of between 700 and 7000 g/mol.

8. The composition according to claim 3, wherein the polysaccharide has a weight-average molecular weight Mw of between 1000 and 6000 g/mol and a degree of branching DB of between 12% and 30%.

9. The composition according to claim 3, wherein the polysaccharide has a weight-average molecular weight Mw of between 1500 and 5500 g/mol and/or a degree of branching DB of between 15% and 25%.

10. The composition according to claim 3, wherein the polysaccharide has a polymolecularity index PI of at most 4.

11. The composition according to claim 3, the polysaccharide has a polymolecularity index PI of between 1.5 and 4.

12. The composition according to claim 3, wherein the polysaccharide has a dry matter (DM) of between 20% and 70%.

13. A process for preparing the composition according to claim 3, comprising the step of adding an admixture for mineral materials to a composition, wherein, said admixture for mineral materials comprises a polysaccharide having a weight-average molecular weight $M_w$ of at least 500 g/mol and at most 9000 g/mol and a degree of branching DB between 10% and 40%, and said composition comprises one or more mineral materials and is selected from the group consisting of mineral binders, cements, grouts, mortars, concretes, clay anti-swelling agents in the drilling field, lubricating agents in the drilling field, plasticizers in the tiles and bricks field, water loss regulators during firing in the tiles and bricks field, stripping agents in the foundry field and in the fields of sintered or granulated materials, binders in the foundry field and in the field of sintered or granulated materials, sintered materials, agents for protecting against the overcuring of plaster at the paper/plaster interface in the plasterboard field, adhesion promoters in the plasterboard field, mineral dispersions, filled adhesives, paints, coating slips and inks, mineral powders, fillers in the field of mineral dispersions, pigments in the field of mineral dispersions, ceramics in the field of mineral dispersions, carbon black in the field of mineral dispersions, carbon in the field of mineral dispersions, suspension agents in the field of mineral dispersions, dispersants in the field of mineral dispersions, antidust agents in the field of mineral dispersions, clay-based absorbent compositions, binders in the field of clay-based absorbent compositions, and plasticizers in the field of clay-based absorbent compositions.

14. The process according to claim 13, further comprising the step of adding at least one other admixture selected from the group consisting of strength improvers, milling agents, grinding auxiliaries, plasticizers, water-reducing plasticizers, superplasticizers, setting accelerators, hardening accelerators, setting retarders, air entrainment agents, mass water-repellant agents, cure agents and mixtures thereof.

15. The process according to claim 14, wherein said other admixture is selected from the group consisting of admixtures of the saccharidic type, borate, amine, ketone, polyhydroxylic, monocarboxylic, polycarboxylic and polyphosphonic admixtures of the nonsaccharidic type, and mixtures thereof.

16. The process according to claim 14, wherein said other admixture is selected from the group consisting of monosaccharides, hydrogenated monosaccharides, or oxidized monosaccharides, disaccharides, hydrogenated disaccharides, oxidized disaccharides, lactic acid and its salts, acetic acid and its salts, glycerol, lignosulfonates, ethanolamines, borax, polymers and copolymers based on acrylic, methacrylic acid and its salts, maleic acid and its salts, ethers, esters, styrene-based polymers and styrenebased copolymers, and mixtures thereof.

17. The process according to claim 14, wherein said admixture for mineral materials comprising said polysaccharide and said other admixture are added simultaneously.

18. The process according to claim 13, wherein said one or more mineral materials are selected from the, group consisting of silica, quartz, mica, metal oxides, cement, lime, pozzolana, silica fume, blast-furnace and steelmaking slag, fly ash, kaolins, talc, clays, zeolites, bentonites, mineral carbon, calcium carbonate, magnesium carbonate, calcium sulphate, gypsum, carbon black, titanium oxide, graphite and mixtures thereof.

19. The composition according to claim 3, wherein said one or more mineral materials are selected from the group consisting of silica, quartz, mica, metal oxides, cement, lime, pozzolana, silica fume, blast-furnace and steelmaking slag, fly ash, kaolins, talc, clays, zeolites, bentonites, mineral carbon, calcium carbonate, magnesium carbonate, calcium sulphate, gypsum, carbon black, titanium oxide, graphite and mixtures thereof.

* * * * *